United States Patent [19]

Lutz et al.

[11] 4,272,489
[45] Jun. 9, 1981

[54] DEVICE FOR COMPOSTING REFUSE AND SEWAGE SLURRY

[75] Inventors: Willibald Lutz; Heinz Mooss, both of Vienna, Austria

[73] Assignee: Ruthner Industrieanlagen-Aktiengesellschaft, Vienna, Austria

[21] Appl. No.: 962,644

[22] Filed: Nov. 21, 1978

[30] Foreign Application Priority Data

Nov. 24, 1977 [AT] Austria .............................. 8433/77

[51] Int. Cl.³ ..................... B01J 19/28; C05F 11/08
[52] U.S. Cl. ........................................ 422/209; 71/9; 210/620
[58] Field of Search ............... 422/209, 184, 232; 210/15; 71/9

[56] References Cited

U.S. PATENT DOCUMENTS

| 2,936,220 | 5/1960 | Bill et al. | 422/209 X |
| 3,149,922 | 9/1964 | Lavallee | 422/209 |
| 3,171,723 | 3/1965 | Hansen | 422/209 |
| 3,178,267 | 4/1965 | Larson | 422/209 X |
| 3,248,175 | 4/1966 | Emmet | 422/209 |
| 3,676,074 | 7/1972 | Shibayama et al. | 422/209 |
| 3,895,916 | 7/1975 | Rosner | 71/9 X |

FOREIGN PATENT DOCUMENTS

| 219086 | 1/1962 | Austria . |
| 230911 | 1/1964 | Austria . |
| 256900 | 9/1967 | Austria . |
| 2451284 | 5/1976 | Fed. Rep. of Germany | 71/9 |

Primary Examiner—Frank W. Lutter
Assistant Examiner—Roger F. Phillips
Attorney, Agent, or Firm—Fleit & Jacobson

[57] ABSTRACT

A device for composting refuse and sewage slurry, consisting of a rotating drum supporting substantially horizontally with a fixed front wall through which refuse and sewage slurry are fed to the drum, and a fixed rear wall through which the mixture in the drum may be extracted. Means are provided enabling air or another gas containing oxygen, to be passed through the drum either from the front to rear or vice versa. The gas flow is adjustable by regulators in the pipelines taking air to and from the drum. The pipeline supplying air to the drum may be connected to a blower, and means may be provided for regulating the temperature in the drum, and for the complete or partial return of air sucked out of the drum to the drum.

6 Claims, 3 Drawing Figures

DEVICE FOR COMPOSTING REFUSE AND SEWAGE SLURRY

SUMMARY OF INVENTION

A device for composting refuse and sewage slurry, comprising a rotatable drum supported substantially horizontally and having a fixed front wall through which refuse and sewage slurry may be fed to the drum, and a fixed rear wall through which the mixture in the drum may be removed said fixed walls having means enabling an oxygen containing gas mixture to be introduced through one end extracted through the other of said walls, said means being operable to control the direction and rate of gas mixture flow through the drum.

The invention relates to a device for composting refuse and sewage slurry.

It is known that refuse and sewage slurry may be composted in rotating drums. With the known devices, blockages, either of aeration apertures or of material discharge apertures, occur so frequently in operation, that the apertures have to be cleaned very frequently. With the known devices having apertures at the ends of the drum no check is ensured of the quantity of material discharged (see for example Austrian Patent Specification No. 256,900). In the known devices, air is sucked into the interior of the drum through an aperture in a back wall which rotates with the drum casing. This aperture is constantly exposed to the risk of blockage by the material present in the drum. Also the entry of the air is impeded and the power requirement for the suction rises.

In a further proposal that has been made, air supply nozzles are provided disposed spirally around the periphery of the drum. The many separate air pipes from the nozzles terminate in a central distributor box on one of the end walls of the drum. This again is furnished with a fixed cover (not combined in rotation) and a fixed central compressed-air supply line is connected thereto. The distributor box itself, and the drum wall to which it is attached, are fixed integrally to the drum and rotate with it. With such a structure, which is very expensive, it can be seen that rotation of the drum results in a progressive distribution and intermixing of air and refuse within the drum.

In accordance with this invention there is provided a device for composting refuse and sewage slurry, comprising a rotatable drum supported substantially horizontally and having a fixed front wall through which refuse and sewage slurry may be fed to the drum, and a fixed rear wall through which the mixture in the drum may be removed, said fixed walls having means enabling an oxygen containing gas mixture to be introduced through one end and extracted through the other of said walls, said means being operable to control the direction and rate of gas mixture flow through the drum. Apertures are provided in these walls through which the air (or anogher oxygen-containing gas) may be sucked or blown in a controlled or regulated manner. According to the nature and the composition of the refuse and sewage slurry mixture, the air in the drum may be directed either with or against the direction of movement of the material. With special air valves it is possible to accurately meter the air necessary for supporting necessary biological processes, the humidity of the air also being indirectly subject to control or regulation.

It is also possible with a device embodying the invention to carry out a complete or partial return into the drum of air extracted by means of blowers. In this way the temperature within the drum may be kept at a uniform high level.

With the introduction of oxygen (preferably in air), microbial fermentation takes place in the drum. In the fermentation energy is liberated (predominantly in the form of heat) so that the temperature of the mixture of refuse and sewage slurry rises to a temperature in the range 50° to 75° C. Water vapour resulting from this heating may be removed from the drum so that the water content of the refuse and sewage slurry mixture falls from an initial 45 to 65% to some 10 to 25%. The mixture is retained in the constantly rotating drum for 12 to 48 hours. The supply and removal of the mixture from the drum may be effected continuously or intermittently. The heated and partially dehydrated mixture of refuse and sewage slurry undergoes a fermentation process, which is continued in an adjacent collecting or maturing room with a fresh continous supply of oxygen, and this is continued until the material is substantially fermented. At the same time the temperature (and thus the formation of water vapour) decreases so that after a period of from 4 to 8 weeks the composting process is terminated. During this period the initial refuse and sewage slurry mixture passes through what are essentially two fermentation phases, namely a bacterial (microbial) phase and the fungus-creating phase (actinomycetial phase). The end product is a valuable, hygienically satisfactory soil improvement agent.

It is a prerequisite for the water-extraction and fermentation process that the preferably unsorted household and trade refuse is prepared, the fractionation being effected in suitable mills (hammer, plate and/or ball mills) down to a maximum granule size of 40 mm. It is also advantageous to separate iron and other metallic particles before introduction of the fractionated refuse into the rotating drum.

A device embodying the invention will now be described in detail with reference to the accompanying drawing, in which.

Figure 1:
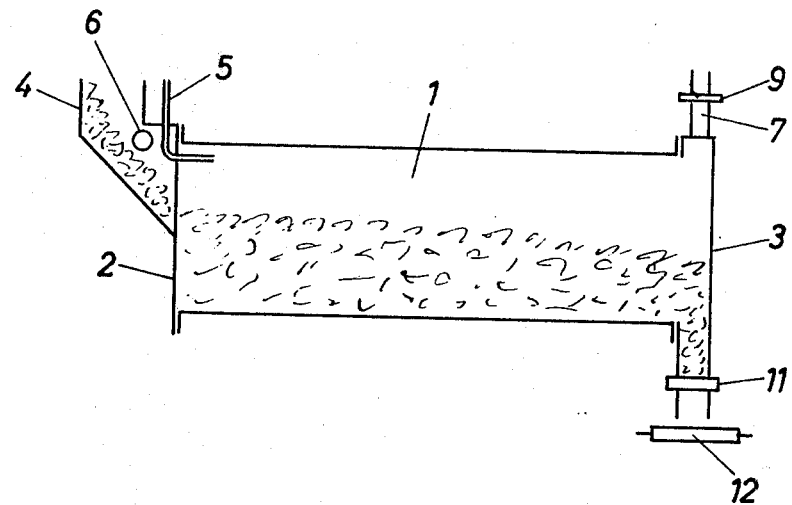
FIG. 1 is a sectional side elevation of the device.
Figure 2:
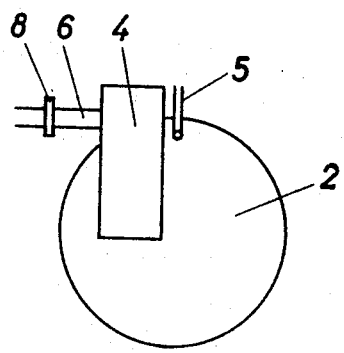
FIG. 2 shows the front of the device of FIG. 1.
Figure 3:
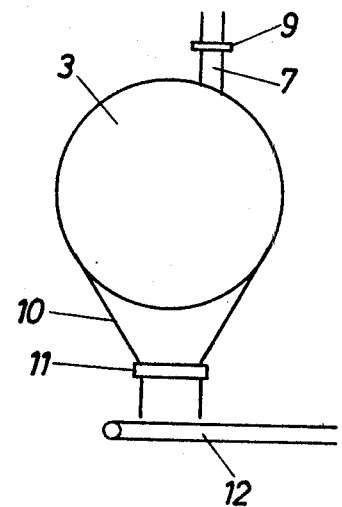
FIG. 3 shows the rear of the device of FIG. 1.

The device shown comprises a cylindrical, rotating drum 1, the front face of which is supplemented by a fixed wall 2 and rear face by a fixed wall 3. The front face carries a feeding hopper 4, through which prepared refuse material is introduced. Sewage slurry or another liquid is led to the drum 1 via a pipeline 5. Introduction and removal of air is effected via pipelines 6 and 7 at the front and the rear of the drum. In this way it is possible for the air to be blown in to the drum via either pipeline 6 or pipeline 7 and removed from the drum via the other pipeline, in dependence upon whether a common or opposed flow is chosen for the air and the material to be treated.

Regulators 8 and 9 are provided in the pipelines 6, 7 respectively for the control of air introduced to or extracted from the drum. The regulators 8 and 9 may be steplessly adjustable disc or flap valves. The air pipelines are advantageously connected to a blower (not shown).

Discharge of the material in the drum is effected, at the rear of the drum 1, via a discharge funnel 10 and a metering device 11 onto a conveyor belt 12.

What is claimed is:

1. A device for composting refuse and sewage slurry, comprising a rotatable drum supported substantially horizontally having a fixed front wall through which refuse and sewage slurry may be fed to the drum, and a fixed rear wall through which the mixture in the drum may be removed, said fixed walls having introducing and extracting means for introducing an oxygen containing gas mixture through one wall and for extracting the gas mixture through the other of said walls, said introducing and extracting means being operable to control the direction and rate of gas mixture flow through the drum and including a gas pipeline having a regulator provided at each end of the drum, said regulators being connectable to a blower such that the direction of gas mixture flow in the drum may be effected both from the front to the rear of the drum and from the rear to the front of the drum.

2. A device according to claim 1, including means for the regulation of temperature in the drum and means for the complete or partial return of gas mixture extracted from the drum to the drum.

3. A device according to claim 1 or claim 2, wherein the means for introducing said gas mixture to the drum is adapted to pass air to said drum.

4. A device according to claim 1, wherein said introducing and extracting means further comprises a first pipeline in fluid communication with one end of said rotatable drum and a second pipeline in fluid communication with the other end of said rotatable drum, ends of said first and said second pipelines being spaced from the interior of said rotatable drum so that said pipelines are free from contact with material inside of said drum.

5. A device according to claim 1, further comprising a feed hopper connected to said fixed front wall for introducing refuse into said rotatable drum, and a pipeline passing through said feed hopper into said rotatable drum for introducing sewage slurry directly into the interior of said rotatable drum.

6. A device according to claim 5, wherein said introducing and extracting means further comprises a pipeline connected to said hopper for selectively introducing and extracting a gas mixture from said rotatable drum.

* * * * *